United States Patent [19]

Kossin

[11] Patent Number: 4,566,221
[45] Date of Patent: Jan. 28, 1986

[54] FLOWER SUPPORT FOR WEDDING BOUQUETS AND THE LIKE

[76] Inventor: Jacqualine Kossin, 9805 Columbia Rd., Olmsted Falls, Ohio 44138

[21] Appl. No.: 637,493

[22] Filed: Aug. 3, 1984

[51] Int. Cl.⁴ .............................................. A01G 5/00
[52] U.S. Cl. .................................... 47/41.12; 47/41.13
[58] Field of Search .................... 47/41.12, 41, 41.13, 47/41.11, 41.2

[56] References Cited

U.S. PATENT DOCUMENTS

| | | | |
|---|---|---|---|
| Re. 23,625 | 3/1953 | Bussert | 41/10 |
| 1,295,581 | 2/1919 | Palmer | 47/41 R |
| 1,589,848 | 6/1926 | Harrison | 206/423 |
| 2,618,901 | 11/1952 | Braun | 47/41 |
| 2,765,585 | 10/1956 | Smithers | 47/41 |
| 2,891,353 | 6/1959 | Smithers | 47/41 |
| 2,904,933 | 9/1959 | King | 47/41 |
| 2,922,254 | 1/1960 | Smithers | 47/41 |
| 2,981,033 | 4/1961 | Cheetwood | 47/41 |
| 2,994,985 | 8/1961 | Jackson, Jr. | 47/41 |
| 3,047,981 | 8/1962 | Shupe et al. | 47/41.12 |
| 3,201,900 | 12/1963 | King | 47/41.12 |
| 3,310,912 | 3/1967 | Melander | 47/41.12 |
| 3,368,303 | 2/1968 | Tong | 47/41.12 |
| 3,374,575 | 3/1968 | Tong | 47/41.12 |
| 3,424,641 | 1/1969 | Separa | 161/27 |

Primary Examiner—Robert E. Bagwill
Assistant Examiner—Bradley M. Lewis
Attorney, Agent, or Firm—Watts, Hoffmann, Fisher & Heinke Co.

[57] ABSTRACT

A flower support for wedding bouquets comprising a block of hydrophilic water absorbent synthetic resin foam and a supportive core of expanded synthetic resin foam inside of the block. Picks are provided at the ends of the cut flowers to penetrate into the core of expanded synthetic resin foam to secure flowers to the support.

3 Claims, 2 Drawing Figures

FLOWER SUPPORT FOR WEDDING BOUQUETS AND THE LIKE

TECHNICAL FIELD

The present invention relates generally to flower supporting devices, and more specifically to flower supports of the type having a body of moisture retaining material into which the stems of cut flowers are inserted.

BACKGROUND ART

Floral supports for live cut flowers composed of water retentive synthetic resin foams are described in U.S. Pat. No. 2,765,585. In composing arrangements on these types of holders, the florist inserts either the bare flower stem or a flower stem to which a floral pick has been attached. The floral pick has a point shaped like an arrowhead so that is is less easily pulled or dislodged from the support. These flower holders are not satisfactory for large bouquets such as bridal bouquets with cascades of depending flowers because the water retentive synthetic foams are delicate and friable, and the flowers, with or without attached picks, can fall out of the arrangement when the bouquet is carried. Sometimes the weight of the flower itself causes the stem or the stem with attached pick to pull out from the foam support.

DISCLOSURE OF THE INVENTION

The present invention overcomes the foregoing problems and provides a new, moisture retaining flower support that is constructed to hold the inserted flower stems more securely than the supports of the prior art. In a preferred embodiment, the improved flower support of the invention comprises a moisture retentive block of synthetic resin foam, and an inner supportive core of rigid material capable of being pierced by a floral pick or the like, the core being stronger than the surrounding moisture retentive resin foam and non-friable.

When flower stems with attached floral picks are driven through the moisture retentive section, the arrowhead of the floral pick becomes securely engaged in the stronger core, while the ends of the stems remain in the surrounding, moisture retaining section. Even long stemmed heavy flowers depending downward from the arrangement are securely held and are less likely to fall out of the holder when carried.

The rigid supportive core can be made of any number of foamed resinous materials such as polystyrene or polyurethane. The core can be of any desired shape, such as conical or cylindrical, as long as it is surrounded by moisture retentive foam of depth sufficient to provide the flower stems with the necessary moisture.

BEST MODE FOR CARRYING OUT THE INVENTION

Figure 1:
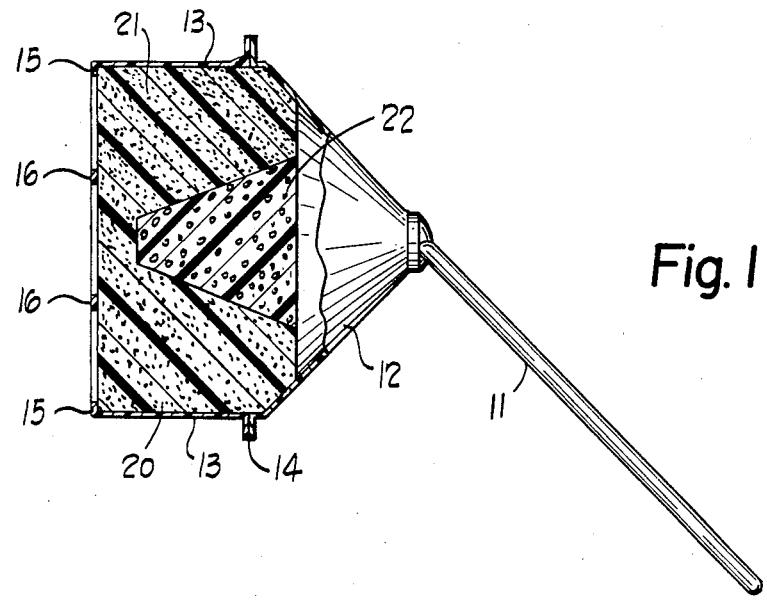
FIG. 1 is a cross-sectional view of the improved flower support with the rigid supportive core of the invention.
Figure 2:
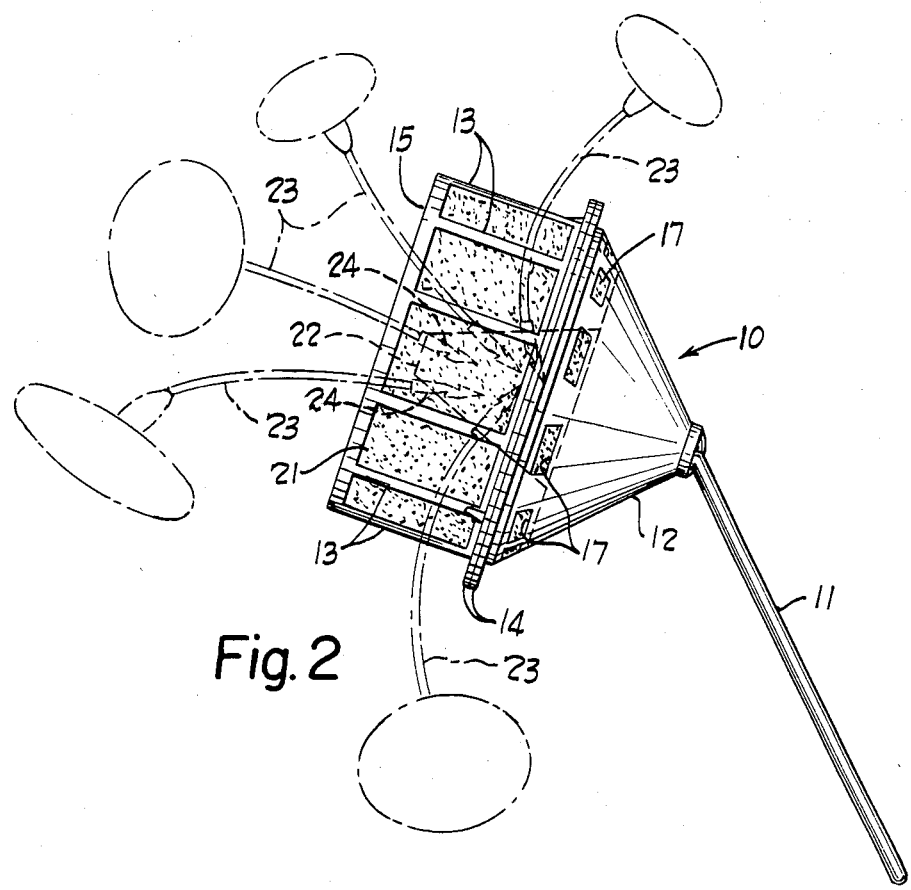
FIG. 2 is a view of a bouquet holder showing in cross-section the improved flower support with the rigid supportive core of the invention.

Referring now to the drawing, reference numeral 10 designates a cage-type holder which can be held in the hand by means of a handle 11. The holder 10, which may be of any suitable construction known in the art, is shown as being comprised of a cap 12 and spaced parallel side ribs 13. The ribs 13 extend between a pair of mating reinforcing rings 14 adjacent the cap 12 and an annular base flange 15. The bottom of the holder is formed by spaced bottom ribs 16 extending across the base flange 15. As disclosed, for example, in U.S. Pat. No. 2,891,353, the holder 10 and the handle 11 may be molded from a suitable synthetic resin, such as polyethylene or the like.

The holder 11 contains the improved flower support member 20 of the invention. It will be seen that the member 20 is exposed between the ribs 13, 16 to permit the insertion of flower stems. If desired, the cap 12 may be formed with openings 17 to facilitate water absorption when the member 20 is immersed in water.

The flower support member 20 is comprised of a moisture retentive block 21 and an inner, rigid supportive core 22. The moisture retentive block 21 may be a hydrophilic water absorbent foam of the type described in U.S. Pat. No. 2,891,353. The rigid supportive core 22 is a non-water absorbent material, such as an expanded cellular polystrene of the type used by florists. A suitable polystrene may be of a density of 2 pounds per cubic foot.

In use, flower stems 23 with floral picks 24 attached are inserted into the member 20 so that the arrowheads of the floral picks are securely embedded in the core 22 while the cut ends of the flower stems remain in the moisture retention block 21. The penetration of the picks into the core 22 serves to secure the flowers against falling out of the arrangement when the illustrated device is carried. At the same time, the block 21 provides the desired moisture to the ends of the flower stems. Thus, it will be seen that the invention provides an improved floral support which combines a source of moisture for cut flowers with a means to securely hold the flower stems against dislodgement.

Many variations and modifications of the invention will be aparent to those skilled in the art in light of the foregoing disclosure. Therefore, it is to be understood that, within the scope of the appended claims, the invention can be practiced otherwise than as specifically shown and described.

I claim:

1. A flower holder in combination with live cut flowers comprising:
   a moisture retentive block of hydrophilic water absorbent synthetic resin foam, a supportive core of expanded, synthetic resin foam inside of said block, said core being shaped and located in position so that it is penetrated by floral picks on the ends of flower stems inserted into said block, and said core being non-friable and stronger than said block, whereby live cut flowers are held securely in said holder by penetration of the floral picks into said core, with the cut ends of the stems terminating within said block short of said core and are kept fresh by maintaining the cut ends of the flower stems exposed to moisture in said block.

2. A live cut flower and holder assembly comprising a moisture retentive block of hydrophilic water absorbent synthetic resin foam, a supportive core of expanded, synthetic resin foam inside of said block, said core being non-friable and stronger than said block, and a plurality of live cut flowers having floral picks attached to their stems, the stems of said flowers being inserted into said block so that said core is penetrated by said picks while the cut ends of said stems terminate short of said core and are exposed to water in said block, whereby said flowers are kept fresh and secure by said holder.

3. The improvement of claim 1 wherein the inner supportive core is polystyrene.

* * * * *